United States Patent Office 3,388,124
Patented June 11, 1968

3,388,124
6β,19β-OXIDO-3,5-CYCLOSTEROID COMPOUNDS AND PROCESS FOR PREPARING THE SAME
Katsumi Tanabe, Rinji Takasaki, Kiyoshi Sakai, Ryozo Hayashi, Yasuhiro Morisawa, and Teruo Hashimoto, Tokyo, Japan, assignors to Sankyo Company, Limited, Tokyo, Japan
No Drawing. Filed Jan. 23, 1963, Ser. No. 253,268
Claims priority, application Japan, Feb. 8, 1962, 37/3,939
6 Claims. (Cl. 260—239.55)

This invention relates to 6β,19β-oxido-3,5-cyclo-steroid compounds having the general formula

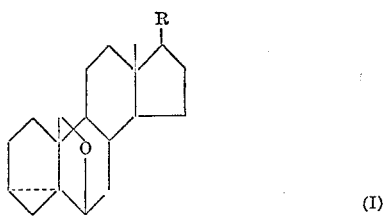

(I)

wherein R is a member selected from the group consisting of keto group (=O), O-lower aliphatic acyl group containing 2 to 4 carbon atoms such as O-ocetyl, O-propionyl or O-butyryl, acetyl group and

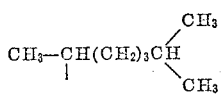

group, and it further relates a process for preparing these compounds.

The 6β,19β-oxido-3,5-cyclosteroid compounds having the above mentioned Formula I produced by the process according to the present invention are novel compounds unknown in the prior arts and useful as intermediates for the preparation of various 19-nor-steroid compounds possessing potent physiological activities. For example, 6β,19-oxido-3,5-cyclo-5α-androstan-17-one can be converted to a known compound, 19-nor-androst-4-ene-3,17-dione by heating the former in an aqueous solvent, such as 90% aqueous acetone, containing a mineral acid such as sulfuric acid to form 3β,19 - dihydroxyandrost-5-en-17-one, successively subjecting the latter to oxidation with Jones' reagent, to hydrolysis with alkali and then to oxidation with Jones' reagent to form 10β-carboxy-estra-5-ene-3,,17-dione and treating the latter with a mineral acid such as hydrochloric acid or alkali to form 19-nor-androst-4-ene-3,17-dione, which is known to be an important intermediate for physiologically active 19-nor-steroid compounds. Alternatively, 6β,19-oxido-3,5-cyclo-5α-androstan-17-one can be converted to a known compound, estra-5(10)-ene-3,17-dione by reacting the former with acetic acid and Lewis acid such as borone-trifluoride etherate to form 3β,19-dihydroxy androst-5-en-17-one 3-acetate, oxidizing the latter with Jones' reagent to form 3β-hydroxyestra-5-en-17-one-10β-carboxylic acid 3-acetate, subjecting the latter to pyrolysis to form 3β-acetoxyestra-5(10)-en-17-one, hydrolyzing the latter with alkali to form 3β-hydroxyestra-5(10)-en-17-one and oxidizing the latter with Jones' reagent to form estra-5(10)-ene-3,17-dione, which is known to be an important intermediate for physiologically active 19-nor-steroid compounds.

It is an object of this invention to provide new steroid compounds, 6β,19β-oxido-3,5-cyclosteroid compounds having the above Formula I useful as intermediates for the preparation of various 19-nor-steroid compounds possessing potent physiological activities and a process for preparing these compounds.

According to the present invention, the above-mentioned 6β,19β-oxido-3,5-cyclosteroid compounds may be produced by treating 6β-hydroxy-3,5-cyclosteroid compounds having the general formula

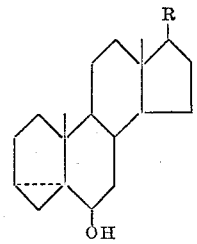

wherein R has the same meaning as above with lead tetracetate in an inert water-immiscible organic solvent.

Examples of the inert water-immiscible organic solvents used in the process according to the present invention include benzene, toluene, carbon tetrachloride, cyclohexane and hexane. It is preferable to carry out the reaction at a temperature between about 70° C. and about 110° C. under moisture-free conditions for about 2 to 24 hours. It has been found advantageous that the reaction is effected in the presence of a catalytic amount of a substance capable of producing free-radical such as benzoyl peroxide.

After completion of the reaction, the reaction product is isolated from the reaction mixture by one of the conventional procedures. For example, after completion of the reaction, the reaction mixture is filtered, the filtrate is successively washed with potassium iodide solution, sodium thiosulfate solution and then water, the organic layer is separated from the aqueous layer, the organic layer separated is distilled and the residue is subjected to chromatography.

Examples of 6β-hydroxy-3,5-cyclosteroid compounds used as the starting material are 6β-hydroxy-3,5-cyclo-5α-androstan-17-one. Compound I 6β,17β-dihydroxy-3,5-cyclo-5α-androstane-17-acetate, Compound II 6β-hydroxy-3,5-cyclo-5α-pregnan-20-one, Compound III and 6β-hydroxy-3,5-cyclo-5α-cholestane, Compound IV. Literature references to the preparation of these compounds are as follows: Compound I: A. Butenandt; L. A. Surdnyi; Ber. 75 591 (1942); Compound II: This compound is prepared by treating the 3β,17β-dihydroxy androst-5-one 17-acetate of P. Wieland, K. Miescher; Helv. Chim. Acta, 32 1768 (1949) with tosyl chloride, then treating the resultant compound with potassium acetate in aqueous acetone; Compound III: D. K. Patel, V. Petrow, I. A. Stuart-Webb, J.C.S., 1957, 665; Compound IV: E. M. Kosower, S. Winstein, J.A.C.S., 78, 4347 (1956). Examples of 6β,19β-oxido-3,5-cyclosteroid compounds obtained by the process according to the present invention are 6β,19-oxido-3,5-cyclo-5α-androstan-17-one, 6β,19-oxido-3,5-cyclo-5α-androstan - 17β-ol 17-acetate, 6β,19-oxido-3,5-cyclo-5α-pregnan-20-one and 6β,19-oxido-3,5-cyclo-5α-cholestane.

Examples of this invention will be illustrated below. However, it is to be understood that the following examples are given for illustration but not for limitation of the scope of this invention.

EXAMPLE 1

To a solution of 1.0 g. of 6β-hydroxy-3,5-cyclo-5α-androstan-17-one in 50 ml. of benzene are added 2.0 g. of lead tetracetate and the resulting mixture is refluxed under moisture-free conditions for 20 hours. After completion of the reaction, the reaction mixture is cooled and filtered over Celite to remove lead diacetate formed during the reaction. The filtrate is successively washed with 5% potassium iodide solution, water, 5% sodium thiosulfate solution and water. After drying of the filtrate over sodium sulfate, the filtrate is distilled to remove the organic solvent. The residue is a pale yellow, syrupy substance. The residue is dissolved in a mixture of benzene and n-hexane (1:4) and the solution is passed through a column of alumina (Woelm, grade III). First elution with a mixture of benzene and n-hexane (1:4) gives 366 mg. of a substance melting at 126 to 128° C. which is recrystallized from n-hexane to give 6β,19-oxide-3,5-cyclo-5α-androstan - 17 - one as needles having a melting point of 136 to 138° C.

*Analysis.*—Calc'd for $C_{19}H_{26}O_2$: C, 79.68%; H, 9.15%. Found: C, 79.31%; H, 9.21%.

Subsequent elution with benzene gives 480 mg. of the starting material having a melting of 128 to 130° C. which is recrystallized from n-hexane to give a crystalline material melting at 136 to 138° C. The yield of the desired product on the basis of the starting material except the recovered one is about 70%.

EXAMPLE 2

To a solution of 10 g. of 6β-hydroxy-3,5-cyclo-5α-pregnan-20-one in 500 ml. of benzene are added 20 g. of lead tetracetate and 1.0 g. of benzoyl peroxide and the mixture is refluxed under moisture-free conditions for 15 hours. After completion of the reaction, the reaction mixture is cooled and filtered over Celite to remove lead diacetate formed during the reaction. The filtrate is successively washed with 5% potassium iodide solution, water, 5% sodium thiosulfate solution and water. The filtrate is dried over anhydrous sodium sulfate and distilled to remove the solvent. The residue is dissolved in a mixture of benzene and n-hexane (2:1) and the solution is chromatographed on alumina (Woelm, grade III). Elution with a mixture of benzene and n-hexane gives 1.56 g. of a substance having a melting point of 165 to 175° C. which is recrystallized from hexane to yield 6β,19-oxido-3,5-cyclo-5α-pregnan-20-one as prisms melting at 173 to 175° C.

*Analysis.*—Calc'd for $C_{21}H_{30}O_2$: C, 80.21%; H, 9.62%. Found: C, 79.56%; H, 9.42%.

EXAMPLE 3

To a solution of 10 g. of 6β-hydroxy-3,5-cyclo-5α-androstan-17-one in 500 ml. of benzene are added 20 g. of lead tetracetate and 1.0 g. of benzoyl peroxide and the mixture is refluxed under moisture-free conditions for 15 hours. After completion of the reaction, the reaction mixture is cooled and filtered over Celite to remove lead diacetate formed during the reaction. The filtrate is successively washed with 5% potassium iodide solution, water, 5% sodium thiosulfate solution and water. The filtrate is dried over anhydrous sodium sulfate and distilled to remove the solvent. The residue, which is a pale yellow syrupy substance, is dissolved in a mixture of benzene and n-hexane (1:2) and the solution is passed through a column of alumina (Woelm, grade III). First elution with a mixture of benzene and n-hexane (1:2) gives 3.59 g. of a substance melting at 131–134° C. which is recrystallized from n-hexane to yield 6β,19-oxido-3,5-cyclo-5α-androstan-17-one as needles having a melting point of 136 to 138° C. Subsequent elution with benzene gives 3.5 g. of the starting material melting at 134 to 136° C.

EXAMPLE 4

To a solution of 10 g. of 6β-hydroxy-3,5-cyclo-5α-cholestane in 500 ml. of benzene are added 20 g. of lead tetracetate and 1.0 g. of benzoyl peroxide and the mixture is refluxed under moisture-free conditions for 18.5 hours. After completion of the reaction, the reaction mixture is cooled and filtered over Celite to remove lead diacetate formed during the reaction. The filtrate is successively washed with 5% potassium iodide, water, 5% sodium thiosulfate solution and then water, dried over anhydrous sodium sulfate and distilled to remove the solvent. The residue is dissolved in a mixture of benzene and n-hexane (1:4) and the solution is passed through a column of alumina (Woelm, grade III). First elution with a mixture of benzene and n-hexane (1:3) gives 3.6 g. of substance having melting point of 80–81° C. which is recrystallized from acetone to yield 6β,19-oxido-3,5-cyclo-5α-cholestane as needles melting at 81 to 82° C.

*Analysis.*—Calc'd for $C_{27}H_{44}O$: C, 84.32%; H, 11.53%. Found: C, 83.99%; H, 11.46%.

Subsequent elution with the same eluant is 4.2 g. of the starting material.

EXAMPLE 5

To a solution of 1.350 g. of 6β,19-oxido-3,5-cyclo-5α-androstan-17-one in 135 ml. of glacial acetic acid is added 20 drops of BF₃-etherate and the mixture is allowed to stand at room temperature for 8.5 hours. Water is added to the reaction mixture and the mixture is extracted with ethyl ether. The extract is washed with sodium bicarbonate solution, dried and distilled to remove the ethyl ether. The residue is chromatographed on Woelm alumina of grade III. Elution with benzene gives 1.397 g. of 3β,19-dihydroxyandrost-5-en-17-one 3-acetate melting at 161° C.

EXAMPLE 6

To a solution of 1.18 g. of 3β,19 - dihydroxyandrost-5 - en - 17 - one 3 - acetate in 120 ml. of acetone is added 3 ml. of Jones' reagent (a solution prepared by dissolving 26.72 g. of chromic anhydride in 23 ml. of concd. sulfuric acid and diluting the solution with water to a total volume of 100 ml.) in nitrogen atmosphere at a temperature of 18° C. and the mixture is stirred. After 5 minutes, an additional amount of 1.8 ml. of Jones' reagent is added to the mixture and the mixture is stirred at the same temperature for an additional 7 minutes. After completion of the reaction, 1 ml. of methanol is added to the reaction mixture and the mixture is distilled under reduced pressure to remove most of the solvent. Water is added to the residue and the mixture is extracted with ethyl ether. The extract is shaken with 5% sodium bicarbonate solution and aqueous layer is separated from organic layer. The aqueous layer is made acidic by dilute hydrochloric acid and the acidified aqueous layer is extracted with ethyl acetate. The extract is washed with water, dried anhydrous sodium sulfate and distilled to remove the solvent. There is obtained the desired product as white crystalline substance. Recrystallization of the white crystalline substance from a mixture of acetone and ethyl ether gives 3β - hydroxyestra - 5 - en - 17 - one-10β - carboxylic acid 3 - acetate having melting point of 253° C. (with decomposition).

*Analysis.*—Calc'd for $C_{21}H_{28}O_5$: C. 69.97%; H, 7.83%. Found: C, 69.81%; H, 7.92%.

EXAMPLE 7

In a 50 ml. round-bottomed flask immersed in an oil bath maintained at a temperature of 260 to 270° C., 120 mg. of 3β - hydroxyestra - 5 - en - 17 - one - 10β - carboxylic acid 3 - acetate obtained in Example 6 is placed under nitrogen atmosphere, whereby the molten content is subjected to pyrolysis with decarboxylation. After a period of 10 minutes, the decomposed product is cooled and extracted with ethyl ether. Distillation of the ethyl ether from the extract gives a syrupy substance. The syrupy substance is dissolved in a mixture of benzene and n - hexane (1:1). The solution is passed through a column of alumina (Woelm, grade III). Elution with a mixture of benzene and n - hexane (1:1), evaporation of the solvent from the eluate and recrystallization of the residue thus obtained from aqueous acetone give 3β - acetoxy-estra-5(10)-en-17-one melting at 76.5 to 77.5° C.

*Analysis.*—Calc'd for $C_{20}H_{28}O_3$: C, 75.91%; H, 8.92%. Found: C, 75.85%; H, 8.71%.

EXAMPLE 8

A solution of 3β-acetoxyestra-5(10)-en-17-one in 10 ml. of 2% methanolic potassium hydroxide solution is heated under reflux for 1.5 hours. After completion of the reaction, water is added to the reaction mixture and the mixture is extracted with ethyl ether. The extract is washed with water, dried and distilled to remove the ethyl ether. Addition of a small amount of hexane to the syrupy substance gives a crystalline substance which is recrystallized from hexane to yield 3β-hydroxyestra-5(10)-en-17-one as crystalline substance melting at 131 to 132° C.

*Analysis.*—Calc'd for $C_{18}H_{26}O_2$: C, 8.79%; H, 9.55%. Found: C, 79.13%; H, 9.41%.

EXAMPLE 9

To a solution of 40 mg. of 3β-hydroxyestra-5(10)-en-17-one in 5 ml. of acetone is added 0.05 ml. of Jones' reagent under nitrogen atmosphere with stirring and the mixture is stirred. After a period of 3 minutes, 0.5 ml. of methanol is added to the reaction mixture and the mixture is extracted with ethyl ether. The extract is washed with water, dried over anhydrous sodium sulfate and distilled to remove the ethyl ether. The residual syrupy substance is recrystallized from ethyl ether to yield estra-5(10)-ene-3.17-dione melting at 148° C.

*Analysis.*—$C_{18}H_{24}O_2$: C, 79.39%; H, 8.88%. Found: C, 79.52%; H, 8.72%.

We claim:
1. A compound having the general formula

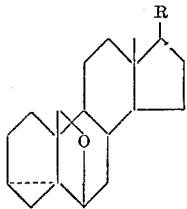

wherein R is a member selected from the group consisting of keto group (=O), O-lower aliphatic acyl group containing 2 to 4 carbon atoms, acetyl group and

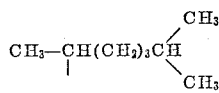

group.

2. A compound of the formula

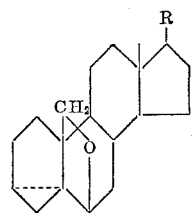

wherein R is selected from the group consisting of keto and a lower hydrocarbon carboxylic acyloxy group.

3. 6β,19-oxido-3,5-cyclo-5α-androstan-17-one.
4. 6β,19-oxido-3,5-cyclo-5α-androstan-17-ol 17-acetate.
5. 6β,19-oxido-3,5-cyclo-5α-pregnan-20-one.
6. 6β,19-oxido-3,5-cyclo-5α-chloestane.

References Cited

UNITED STATES PATENTS

| | | | |
|---|---|---|---|
| 3,001,989 | 9/1961 | Ringold et al. | 260—239.55 |
| 3,008,957 | 11/1961 | Ringold et al. | 260—239.55 |
| 3,033,862 | 5/1962 | Ringold et al. | 260—239.55 |
| 3,036,068 | 5/1962 | Ringold et al. | 260—239.55 |
| 3,065,228 | 11/1962 | Bowers | 260—239.55 |
| 3,067,198 | 12/1962 | Wettstein et al. | 260—239.55 |

LEWIS GOTTS, *Primary Examiner.*

H. A. FRENCH, *Assistant Examiner.*